J. YOUNG.
Corn Husker.
No. 34,033. Patented Dec. 24, 1861.
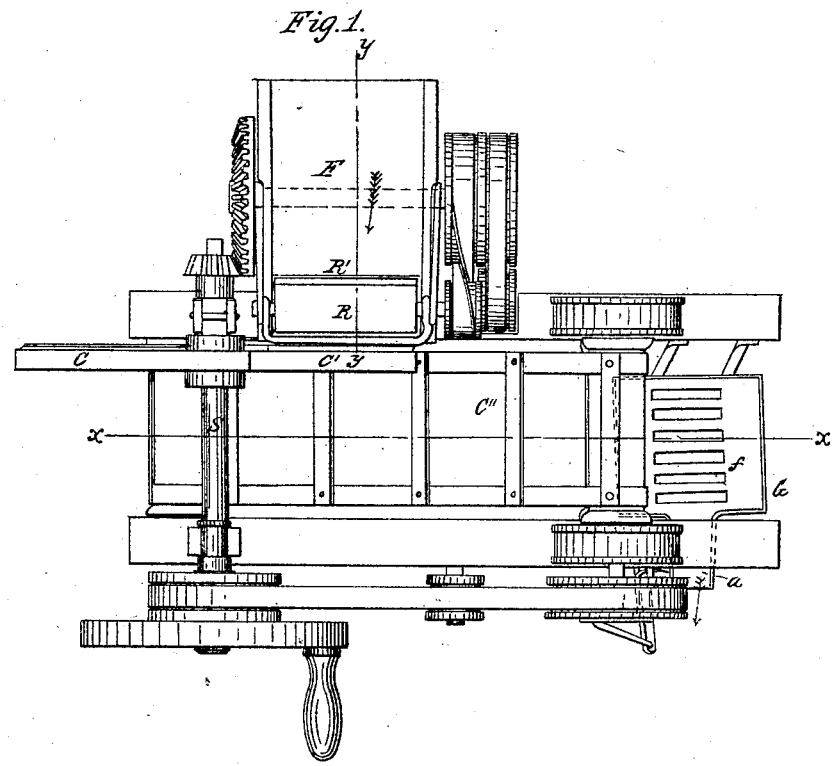
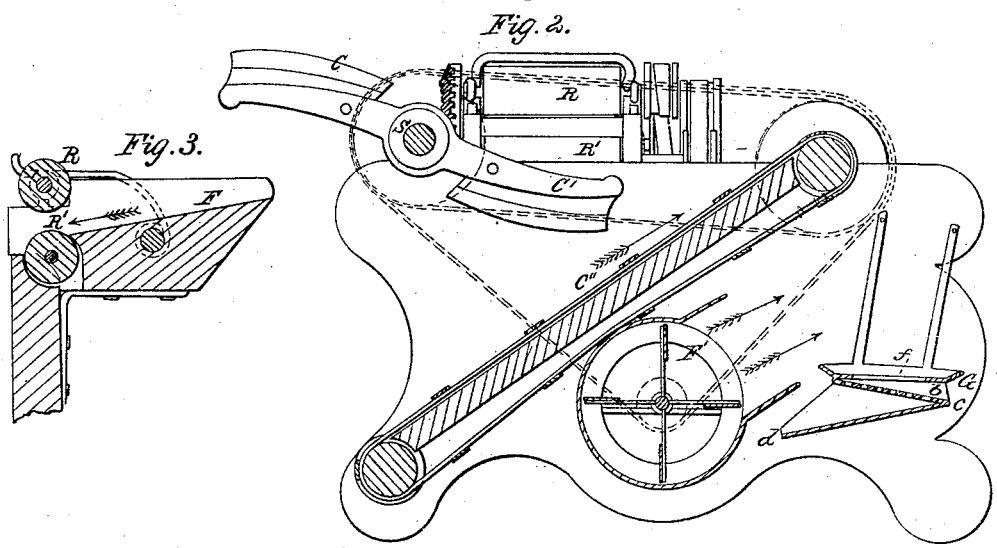
Witnesses:
Geo Patten
Jus O'Cleary
Inventor:
Joseph Young

UNITED STATES PATENT OFFICE.

JOSEPH YOUNG, OF VARICK, NEW YORK, ASSIGNOR TO JNO. B. AND JOS. YOUNG.

IMPROVEMENT IN MACHINES FOR REMOVING THE HUSKS FROM CORN.

Specification forming part of Letters Patent No. 34,033, dated December 24, 1861.

*To all whom it may concern:*

Be it known that I, JOSEPH YOUNG, of Varick, in the county of Seneca and State of New York, have invented a new and useful Improvement in Machines for Removing the Husk from Indian Corn; and I do hereby declare that the following is a full, clear, and exact description of the same, reference being had to the annexed drawings, forming part of this specification, in the several figures of which similar characters of reference denote the same part.

Figure 1 is a top view of the machine; Fig. 2, a vertical section on $x\ x$. Fig. 3 is a vertical section on $y\ y$.

The object of this invention is to bring the several parts of Indian corn as cut from the field into a condition in which they can be used, the invention consisting in the combination of devices for cutting up the stalk, blades, and ear and separating the resulting mixture, so that the husked corn will be separated from the fodder.

In the drawings, F is the feed-chute, through which and between the revolving feed-rollers R R' the stalk with ears attached, as it is cut from the field, is passed. Perpendicular to the rollers R R' is a shaft, S, carrying cutters C C', which pass across the faces of the rollers and sever the product as it passes from between the rollers. This cuts up stalk, blades, and ear, the ear being cut into two or three pieces, dependent on manner of presentation. The result of the cutting then falls upon an endless conveyer, C'', and, falling over its head, drops upon the riddle G. In passing from the conveyer to the riddle the product passes through a fan-blast generated by the revolving fan F'. This carries off from the head of the machine the blades, husk, and lighter portions of the stalk.

There falls upon the screen $f$ the cut portions of ear with the husk removed and the heavier stalk pieces. The ear pieces pass off by spout $a$ into a suitable receiver, together with such butt pieces as may not pass through the meshes of screen $f$. The stalk pieces and shattered corn pass to screen $b$, the stalks passing off at $c$, and the grain passing through the mesh, being discharged at $d$. In this manner the several parts are separated, the blades and husk being in condition for fodder and the ear stripped of its husk ready for the crib, the whole operation being performed for more rapidly than by any other process.

It is obvious that instead of using the knives, as shown in the drawings, any equivalent device for accomplishing the same object may be substituted—as, for instance, the sliding gate or the saw.

I do not claim any of the elements of my machine separately considered; but

What I claim as my invention, and desire to secure by Letters Patent, is—

The combination of the cutting apparatus with the fan-blast and separator arranged and operating substantially as and for the purpose set forth.

In testimony whereof I have hereunto signed my name before two subscribing witnesses.

JOSEPH YOUNG.

Witnesses:
GEO. PATTEN,
JOHN S. HOLLINGSHEAD.